United States Patent
Turtinen et al.

(10) Patent No.: US 12,075,282 B2
(45) Date of Patent: Aug. 27, 2024

(54) ENHANCEMENT OF MEDIUM ACCESS CONTROL SUBHEADERS

(71) Applicant: Nokia Technologies Oy, Espoo (FI)

(72) Inventors: Samuli Turtinen, Li (FI); Chunli Wu, Beijing (CN); Benoist Sebire, Tokyo (JP); Zexian Li, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/095,179

(22) Filed: Jan. 10, 2023

(65) Prior Publication Data

US 2023/0164625 A1     May 25, 2023

Related U.S. Application Data

(63) Continuation of application No. 17/047,282, filed as application No. PCT/CN2018/085596 on May 4, 2018, now Pat. No. 11,576,076.

(30) Foreign Application Priority Data

Apr. 13, 2018  (WO) ............... PCT/CN2018/083124

(51) Int. Cl.
*H04W 28/06* (2009.01)
*H04W 72/20* (2023.01)
(Continued)

(52) U.S. Cl.
CPC ........... *H04W 28/06* (2013.01); *H04W 72/20* (2023.01); *H04W 72/23* (2023.01); *H04W 74/0833* (2013.01)

(58) Field of Classification Search
None
See application file for complete search history.

(56) References Cited

U.S. PATENT DOCUMENTS 8,340,128 B2 * 12/2012 Joo ................. H04W 28/065
                                                        370/470
11,252,782 B2   2/2022 Son
(Continued)

FOREIGN PATENT DOCUMENTS

CN          101222416 A      7/2008
CN          101242397 A      8/2008
(Continued)

OTHER PUBLICATIONS

Ericsson, "Msg3 Size for CCCH Payload", 3GPP TSG-RAN WG2 #101, R2-1803202, (Feb. 26-Mar. 2, 2018), 3 pages.
(Continued)

*Primary Examiner* — Hong S Cho
(74) *Attorney, Agent, or Firm* — ALSTON & BIRD LLP

(57) ABSTRACT

In accordance with an example embodiment of the apparatus there is at least a method and apparatus to perform determining a grant for data to be communicated, comprising identifying logical channels to be multiplexed into a medium access control protocol data unit for the data to be communicated, wherein at least one of a logical channel identifier for at least one logical channel of the multiplexed logical channels and length of at least one logical channel service data unit is configured to be omitted from the medium access control protocol data unit. Further in accordance with an example embodiment of the apparatus there is at least a method and apparatus to perform receiving a grant for the data to be communicated, comprising logical channels multiplexed into a medium access control protocol data unit for the data to be communicated, wherein at least one of a logical channel identifier for at least one logical channel of the multiplexed logical channels and length of at least one logical channel service data unit is configured to be omitted from the medium access control protocol data unit.

40 Claims, 11 Drawing Sheets

910: determining a grant for data to be communicated, comprising identifying logical channels to be multiplexed into a medium access control protocol data unit for the data to be communicated 920: wherein at least one of a logical channel identifier for at least one logical channel of the multiplexed logical channels and length of at least one logical channel service data unit is configured to be omitted from the medium access control protocol data unit

(51) Int. Cl.
  *H04W 72/23* (2023.01)
  *H04W 74/0833* (2024.01)

(56) References Cited

U.S. PATENT DOCUMENTS

| | | | |
|---|---|---|---|
| 11,576,076 | B2 | 2/2023 | Turtinen et al. |
| 2003/0007517 | A1 | 1/2003 | Beckmann et al. |
| 2006/0007886 | A1 | 1/2006 | Lee et al. |
| 2006/0209896 | A1 | 9/2006 | Choi et al. |
| 2009/0046648 | A1 | 2/2009 | Joo et al. |
| 2009/0141670 | A1 | 6/2009 | Duncan |
| 2009/0163211 | A1 | 6/2009 | Kitazoe et al. |
| 2010/0296464 | A1 | 11/2010 | Barraclough et al. |
| 2015/0043547 | A1* | 2/2015 | Pelletier ............... H04W 72/21 370/336 |
| 2016/0073449 | A1 | 3/2016 | Pang et al. |
| 2016/0080531 | A1 | 3/2016 | Agiwal |
| 2017/0195464 | A1 | 7/2017 | Lee et al. |
| 2018/0124637 | A1 | 5/2018 | Kim et al. |

FOREIGN PATENT DOCUMENTS

| | | |
|---|---|---|
| CN | 101841857 A | 9/2010 |
| CN | 109983801 A | 7/2019 |
| EP | 3 178 241 A1 | 6/2017 |
| EP | 3240350 A1 | 11/2017 |
| EP | 3319252 A1 | 5/2018 |
| EP | 3756405 B1 | 12/2020 |
| EP | 4072229 A1 | 10/2022 |
| JP | 2011-508538 | 3/2011 |
| RU | 2461987 C2 | 9/2012 |
| WO | WO 2009/086188 A2 | 7/2009 |
| WO | WO 2012/095693 A2 | 7/2012 |
| WO | WO 2016/022053 A1 | 2/2016 |
| WO | WO 2016/163798 A1 | 10/2016 |
| WO | WO 2017/086580 A1 | 5/2017 |
| WO | WO 2019/212243 A1 | 11/2019 |

OTHER PUBLICATIONS

Ericsson, "MAC RAR PDU Design", 3GPP TSG-RAN WG2 #99, R2-1708193, (Aug. 21-25, 2017), 4 pages.
Notice of Allowance for Mexico Application No. MX/a/2020/010826 dated Oct. 5, 2023, 6 pages.
Notice of Allowance for Canadian Application No. 3,096,910 dated May 4, 2023, 1 page.
Office Action for Korean Application No. 10-2023-7021076 dated Aug. 21, 2023, 8 pages.
Office Action for Colombia Application No. NC2020/0014098 dated Jul. 24, 2023, 38 pages.
"3rd Generation Partnership Project; Technical Specification Group Radio Access Network; NR; Medium Access Control (MAC) Protocol Specification (Release 15)", 3GPP TS 38.321 v 15.0.0 (Dec. 2017), 55 pages.
"3rd Generation Partnership Project; Technical Specification Group Radio Access Network; NR; Radio Resource Control (RRC) Protocol Specification (Release 15)", 3GPP TS 38.331 v 15.1.0 (Mar. 2018), 214 pages.
Decision to Grant for Japanese Application No. 2020-555825 dated Oct. 31, 2022, 4 pages.
Decision to Grant for Russian Application No. 2020137060/07 dated Jul. 7, 2021, 19 pages.
Ericsson, "Correction to CCCH and msg3", #GPP TSG-RAN WG2 Meeting #101bis, R2-1805424 (Apr. 2018), 4 pages.
Ericsson, "Msg3 Size for CCCH Payload, 3GPP TSG-RAN WG2 #101bis", R2-1805415 (Apr. 2018), 4 pages.
Ericsson, "Size of MSG3 in NR", 3GPP TSG-RAN WG2 #101Bis, R2-1804860, (Apr. 16-20, 2018), 4 pages.
Extended European Search Report for European Application No. 18914911.5 dated Jan. 4, 2022, 17 pages.
First Examination Report for Indian Application No. 202027049320 dated Jul. 26, 2022, 6 pages.
Fujitsu, "MAC Header Shortening", 3GPP TSG-RAN WG2 #101, R2-1802548 (Mar. 2018), 1 page.
Huawei, "Reply LS on MSG3 Size for NR", 3GPP TSG-RAN WG2 101bis, R2-1806501 (Apr. 2018), 1 page.
International Search Report and Written Opinion for Patent Cooperation Treaty Application No. PCT/CN2018/083124 dated Dec. 29, 2018, 8 pages.
International Search Report and Written Opinion for Patent Cooperation Treaty Application No. PCT/CN2018/085596 dated Dec. 29, 2018, 7 pages.
Nokia et al., "Clarification on the Preamble Group B Selection", 3GPP TSG-RAN WG2 NR Ad hoc 1801, R2-1800965, (Jan. 22-26, 2018), 4 pages.
Nokia et al., "Further Details of MAC PDU Format", 3GPP TSG-RAN WG2 NR Adhoc #2, R2-1706584 (Jun. 29, 2017), 3 pages.
Nokia et al., "LCID Omitting for MAC PDU", 3GPP TSG-RAN WG2 NR Adhoc #2 R2-1706585 (Jun. 29, 2017), 2 pages.
Nokia et al., "MAC Sub-Header Formats", 3GPP TSG-RAN WG2 #99, R2-1708763, (Aug. 21-25, 2017), 11 pages.
Non-Final Office Action for U.S. Appl. No. 17/047,282 dated Feb. 15, 2022.
Notice of Acceptance for Australian Application No. 2018418629 dated Nov. 5, 2021, 3 pages.
Notice of Acceptance for Vietnamese Application No. 1-2020-06567 dated Sep. 29, 2021, 2 pages.
Notice of Allowance for Chilean Application No. 2020-002640 dated Aug. 4, 2022, 2 pages.
Notice of Allowance for Chinese Application No. 201880094575.0 dated May 31, 2023, 16 pages.
Notice of Allowance for Korean Application No. 10-2020-7032646 dated Mar. 22, 2023, 4 pages.
Notice of Allowance for U.S. Appl. No. 17/047,282 dated May 16, 2022.
Notice of Allowance for U.S. Appl. No. 17/047,282 dated Oct. 11, 2022.
Office Action and Search Report for Russian Application No. 2020137060 dated Feb. 9, 2021, 6 pages.
Office Action for Algerian Application No. DZ/P/2020/000574 dated Sep. 12, 2021, 2 pages.
Office Action for ARIPO Application No. AP/P/2020/012763 dated Aug. 2, 2022, 5 pages.
Office Action for Australian Application No. 2018418629 dated Jun. 16, 2021, 4 pages.
Office Action for Canadian Application No. 3,096,910 dated Nov. 29, 2021, 5 pages.
Office Action for Canadian Application No. 3,096,910 dated Sep. 2, 2022, 3 pages.
Office Action for Chilean Application No. 202002640 dated Jan. 21, 2022, 16 pages.
Office Action for Chinese Application No. 201880094575.0 dated Oct. 10, 2022, 12 pages.
Office Action for Egyptian Application No. 1591/2020 dated Jan. 16, 2023, 8 pages.
Office Action for Egyptian Application No. 1591/2020 dated Jul. 31, 2023, 8 pages.
Office Action for Indonesian Application No. P00202008440 dated May 23, 2023, 7 pages.
Office Action for Japanese Application No. 2020-555825 dated May 16, 2022, 4 pages.
Office Action for Japanese Application No. 2020-555825 dated Nov. 2, 2021, 4 pages.
Office Action for Korean Application No. 10-2020-7032646 dated Aug. 29, 2022, 7 pages.
Office Action for Singapore Application No. 11202010135T dated Oct. 3, 2022, 7 pages.
Office Action for Vietnamese Application No. 1-2020-06567 dated Jul. 10, 2023, 4 pages.
Office Action for Vietnamese Application No. 1-2020-06567 dated Jul. 14, 2021, 2 pages.

(56) References Cited

OTHER PUBLICATIONS

Qualcomm Incorporated, "Complexity of "Header Stripping + ROHC Compression" for Relay", 3GPP TSG-RAN WG2 #70bis, R2-103695 (Jul. 2010), 6 pages.
Notice of Grant for Colombian Application No. NC2020/0014098 dated May 20, 2024, 12 pages.
Office Action for European Application No. 18914911.5 dated Mar. 27, 2024, 9 pages.
Office Action for Thailand Application No. 2001005958 dated Apr. 6, 2024, 9 pages.

* cited by examiner

Figure 6.1.2-3: R/LCID MAC subheader

Figure 6.1.2-2: R/F/LCID/L MAC subheader with 16-bit L field

Figure 6.1.2-3: R/LCID MAC subheader

ENHANCEMENT OF MEDIUM ACCESS CONTROL SUBHEADERS

CROSS-REFERENCE TO RELATED APPLICATIONS

The present application is a continuation of U.S. Non-Provisional patent application Ser. No. 17/047,282, filed Oct. 13, 2020 and entitled "Enhancement of Medium Access Control Subheaders," which is a National Stage Entry of International Patent Application Serial No. PCT/CN2018/085596, filed May 4, 2018 and entitled "Enhancement of Medium Access Control Subheaders," which claims priority to, and the benefit of, International Patent Application Serial No. PCT/CN2018/083124, filed Apr. 13, 2018 and entitled "Enhancement of Medium Access Control Subheaders," the entire disclosures of each of which are hereby incorporated herein by reference in their entireties for all purposes.

TECHNICAL FIELD

The teachings in accordance with the exemplary embodiments of this invention relate generally to overhead reduction for specific traffic types to enhance reliability and latency and, more specifically, relate to layer 2 overhead medium access control sub-header reduction for ultra-reliable low latency communications to enhance reliability and latency. Further, the teachings in accordance with the exemplary embodiments of this invention also relate generally to a Random Access procedure carried by MAC protocol in NR, more specifically, to an optimized the MAC PDU structure for Msg3 in the RA procedure from UE to NW.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
 CCCH common control channel
 CE control element
 D/C data control
 LCD logical channel identification
 LCH logical channel
 LCP logical channel prioritization
 NR new radio
 RA random access
 SDU service data unit
 URLLC ultra-reliable low latency communications Advantages of 5th Generation (5G) New Radio (NR) communications technology are envisaged to include supporting expanded and diversified usage scenarios and applications in current and future mobile network generations. Present releases of the 5G NR communications technology includes ultra-reliable low-latency communications (URLLC) with strict requirements.

It is noted that example embodiments as described herein relate to improving at least latency and reliability operations associated with the ultra-reliable low-latency communications.

SUMMARY

In an example aspect of an embodiment of the invention, there is a method comprising: determining a grant for data to be communicated, comprising identifying logical channels to be multiplexed into a medium access control protocol data unit for the data to be communicated, wherein at least one of a logical channel identifier for at least one logical channel of the multiplexed logical channels and length of at least one logical channel service data unit is configured to be omitted from the medium access control protocol data unit.

A further example aspect of an embodiment of the invention is a method comprising the method of the previous paragraph, the method where there is determining that the grant is fulfilling at least one pre-established condition, where the grant is for use with only one logical channel, and wherein based on the pre-established condition the configuring comprises a logical channel identifier for the one logical channel is omitted from the medium access control protocol data unit; the method where the configuring further comprises a Length field of a medium access control subheader is set to all zeros to indicate that no more service data units for the at least one logical channel configured to omit logical channel identity will follow; the method where the configuring further comprises a one bit data control field is set to indicate that one of a Length field follows for a service data unit of a logical channel configured with logical channel identity omit, or a logical channel identifier subheader follows for at least one of a control element or a service data unit of a logical channel not configured with omitted logical channel identity; the method where the at least one pre-established condition comprises the identified logical channels being more than one logical channel and only one logical channel of the more than one logical channel has no data to send, and wherein based on the pre-established condition the configuring comprises a logical channel identifier for the only one logical channel is omitted, and a one-byte length field is set to all zeros; the method where logical channel identifier for more than one logical channels configured to be omitted from the medium access control protocol data unit, wherein the configuring comprises configuring those logical channels in a pre-established order; the method where there is determining a subset of the more than one logical channel with no data to send; and based on the determining, configuring a Length to be set to all zeros to indicate a start of a next logical channel without a logical channel identifier for the subset of the more than one logical channel; the method where there is omitting the length field from the common control channel service data unit of the medium access control protocol data unit; wherein the omitting is based on determining that a length field for the common control channel service data unit of the medium access control meets an exact size criterion; wherein the omitting is based on determining that a same logical channel identifier is used for common control channel service data units of different sizes; wherein the common control channel service data units of different sizes using the same logical channel identifier are indicated by a random access preamble group identifier; wherein the omitting is based on determining that a grant size for Msg3 meets an exact size criterion of a size of the common control channel service data unit+at least one octet; and the determining that the grant size for Msg3 meets an exact size criterion comprises determining that the common control channel service data unit size plus an R/LCID subheader of the medium access control protocol data unit is equal to Msg3 size; and wherein the common control channel service data unit or the medium access control protocol data unit is configured with several logical channel identifiers linked to different fixed sizes for one or more logical channels of the at least one logical channel of the multiplexed channels. determining that the grant size for Msg3 meets an exact size criterion comprises determining that the common control channel service data unit size plus an R/LCID subheader of the medium access control protocol data unit is equal to Msg3 size.

In another example aspect of an embodiment of the invention, there is an apparatus, such as a network side apparatus, comprising: means for determining a grant for data to be communicated, comprising means for identifying logical channels to be multiplexed into a medium access control protocol data unit for the data to be communicated, wherein at least one of a logical channel identifier for at least one logical channel of the multiplexed logical channels and length of at least one logical channel service data unit is configured to be omitted from the medium access control protocol data unit.

A further example aspect of an embodiment of the invention is an apparatus comprising the apparatus of the previous paragraph, the apparatus where there is determining that the grant is fulfilling at least one pre-established condition, where the grant is for use with only one logical channel, and wherein based on the pre-established condition the configuring comprises a logical channel identifier for the one logical channel is omitted from the medium access control protocol data unit; the apparatus where the configuring further comprises a Length field of a medium access control subheader is set to all zeros to indicate that no more service data units for the at least one logical channel configured to omit logical channel identity will follow; the apparatus where the configuring further comprises a one bit data control field is set to indicate that one of a Length field follows for a service data unit of a logical channel configured with logical channel identity omit, or a logical channel identifier subheader follows for at least one of a control element or a service data unit of a logical channel not configured with omitted logical channel identity; the apparatus where the at least one pre-established condition comprises the identified logical channels being more than one logical channel and only one logical channel of the more than one logical channel has no data to send, and wherein based on the pre-established condition the configuring comprises a logical channel identifier for the only one logical channel is omitted, and a one-byte length field is set to all zeros; the apparatus where logical channel identifier for more than one logical channels configured to be omitted from the medium access control protocol data unit, wherein the configuring comprises configuring those logical channels in a pre-established order; the apparatus where there is means for determining a subset of the more than one logical channel with no data to send; and based on the determining, means for configuring a Length to be set to all zeros to indicate a start of a next logical channel without a logical channel identifier for the subset of the more than one logical channel; the apparatus where there is omitting the length field from the common control channel service data unit of the medium access control protocol data unit; wherein the omitting is based on determining that a length field for the common control channel service data unit of the medium access control meets an exact size criterion; wherein the omitting is based on determining that a same logical channel identifier is used for common control channel service data units of different sizes; wherein the common control channel service data units of different sizes using the same logical channel identifier are indicated by a random access preamble group identifier; wherein the omitting is based on determining that a grant size for Msg3 meets an exact size criterion of a size of the common control channel service data unit+at least one octet; and the determining that the grant size for Msg3 meets an exact size criterion comprises determining that the common control channel service data unit size plus an R/LCID subheader of the medium access control protocol data unit is equal to Msg3 size; and wherein the common control channel service data unit for the medium access control protocol data unit is configured with several logical channel identifiers linked to different fixed sizes for one or more logical channels of the at least one logical channel of the multiplexed channels.

In another example aspect of an embodiment of the invention, there is an apparatus, such as a network side apparatus, comprising: at least one memory, the at least one memory comprising computer program code, wherein the computer program code is configured with the at least one processor to cause the apparatus to determine a grant for data to be communicated, comprising identifying logical channels to be multiplexed into a medium access control protocol data unit for the data to be communicated, wherein at least one of a logical channel identifier for at least one logical channel of the multiplexed logical channels length of at least one logical channel service data unit is configured to be omitted from the medium access control protocol data unit.

A further example aspect of an embodiment of the invention is an apparatus comprising the apparatus of the previous paragraph, the apparatus where there is determining that the grant is fulfilling at least one pre-established condition, where the grant is for use with only one logical channel, and wherein based on the pre-established condition the configuring comprises a logical channel identifier for the one logical channel is omitted from the medium access control protocol data unit; the apparatus where the configuring further comprises a Length field of a medium access control subheader is set to all zeros to indicate that no more service data units for the at least one logical channel configured to omit logical channel identity will follow; the apparatus where the configuring further comprises a one bit data control field is set to indicate that one of a Length field follows for a service data unit of a logical channel configured with logical channel identity omit, or a logical channel identifier subheader follows for at least one of a control element or a service data unit of a logical channel not configured with omitted logical channel identity; the apparatus where the at least one pre-established condition comprises the identified logical channels being more than one logical channel and only one logical channel of the more than one logical channel has no data to send, and wherein based on the pre-established condition the configuring comprises a logical channel identifier for the only one logical channel is omitted, and a one-byte length field is set to all zeros; the apparatus where logical channel identifier for more than one logical channels configured to be omitted from the medium access control protocol data unit, wherein the configuring comprises configuring those logical channels in a pre-established order; the apparatus where the apparatus comprising the computer program code is configured with the at least one processor to cause the apparatus to determine a subset of the more than one logical channel with no data to send; and based on the determining, configure a Length to be set to all zeros to indicate a start of a next logical channel without a logical channel identifier for the subset of the more than one logical channel, the apparatus wherein the grant is omitting the length field from the common control channel service data unit of the medium access control protocol data unit; wherein the omitting is based on that a same logical channel identifier is used for common control channel service data units of different sizes; wherein the common control channel service data units of different sizes using the same logical channel identifier are indicated by a random access preamble group identifier; wherein the omitting is based on determining that a grant size for Msg3 meets an exact size criterion of a size of the common control channel service data unit+at least one octet; and the determining that the grant size for Msg3 meets an exact size criterion comprises determining that the common control channel service data unit size plus an R/LCID subheader of the medium access control protocol data unit is equal to Msg3 size; and wherein the common control channel service data unit for the medium access control protocol data unit is configured with several logical channel identifiers linked to different fixed sizes for one or more logical channels of the at least one logical channel of the multiplexed channels.

In an example aspect of an embodiment of the invention, there is a method comprising: receiving a grant for the data to be communicated, comprising logical channels multiplexed into a medium access control protocol data unit for the data to be communicated, wherein at least one logical channel identifier for at least one logical channel of the multiplexed logical channels and length of at least one logical channel service data unit is configured to be omitted from the medium access control protocol data unit.

A further example aspect of an embodiment of the invention is a method comprising the method of the previous paragraph, the method where the at least one pre-established condition comprises the grant is for use with only one logical channel, and wherein based on the pre-established condition the configuring comprises a logical channel identifier for the one logical channel is omitted from the medium access control protocol data unit; the method where the grant further comprises a Length field of a medium access control subheader set to all zeros to indicate that no more service data units for the at least one logical channel configured to omit logical channel identity will follow; the method where the at least one pre-established condition comprises the identified logical channels being more than one logical channel and only one logical channel of the more than one logical channel has no data to send, and wherein based on the pre-established condition the grant comprises a logical channel identifier for the only one logical channel is omitted, and a one-byte length field is set to all zeros; and the method where logical channel identifiers for the more than one logical channels are omitted from the medium access control protocol data unit, wherein the configuring comprises configuring those logical channels in a pre-established order, the method wherein the grant is omitting the length field from the common control channel service data unit of the medium access control protocol data unit; wherein the omitting is based on that a same logical channel identifier is used for common control channel service data units of different sizes; wherein the common control channel service data units of different sizes using the same logical channel identifier are indicated by a random access preamble group identifier; wherein the omitting is based on determining that a grant size for Msg3 meets an exact size criterion of a size of the common control channel service data unit+at least one octet; and the determining that the grant size for Msg3 meets an exact size criterion comprises determining that the common control channel service data unit size plus an R/LCID subheader of the medium access control protocol data unit is equal to Msg3 size; and wherein the common control channel service data unit for the medium access control protocol data unit is configured with several logical channel identifiers linked to different fixed sizes for one or more logical channels of the at least one logical channel of the multiplexed channels.

In another example aspect of an embodiment of the invention there is an apparatus, such as a user equipment side apparatus, comprising: means for receiving a grant for the data to be communicated, comprising logical channels multiplexed into a medium access control protocol data unit for the data to be communicated, wherein at least one logical channel identifier for at least one logical channel of the multiplexed logical channels and length of at least one logical channel service data unit is configured to be omitted from the medium access control protocol data unit.

A further example aspect of an embodiment of the invention is an apparatus comprising the apparatus of the previous paragraph, the apparatus where the at least one pre-established condition comprises the grant is for use with only one logical channel, and wherein based on the pre-established condition the configuring comprises a logical channel identifier for the one logical channel is omitted from the medium access control protocol data unit; the apparatus where the grant further comprises a Length field of a medium access control subheader set to all zeros to indicate that no more service data units for the at least one logical channel configured to omit logical channel identity will follow; the apparatus where the at least one pre-established condition comprises the identified logical channels being more than one logical channel and only one logical channel of the more than one logical channel has no data to send, and wherein based on the pre-established condition the grant comprises a logical channel identifier for the only one logical channel is omitted, and a one-byte length field is set to all zeros; and; the apparatus where logical channel identifiers for the more than one logical channels are omitted from the medium access control protocol data unit, wherein the configuring comprises configuring those logical channels in a pre-established order wherein the grant is omitting the length field from the common control channel service data unit of the medium access control protocol data unit; wherein the omitting is based on that a same logical channel identifier is used for common control channel service data units of different sizes; wherein the common control channel service data units of different sizes using the same logical channel identifier are indicated by a random access preamble group identifier; wherein the omitting is based on determining that a grant size for Msg3 meets an exact size criterion of a size of the common control channel service data unit+at least one octet; and the determining that the grant size for Msg3 meets an exact size criterion comprises determining that the common control channel service data unit size plus an R/LCID subheader of the medium access control protocol data unit is equal to Msg3 size; and wherein the common control channel service data unit for the medium access control protocol data unit is configured with several logical channel identifiers linked to different fixed sizes for one or more logical channels of the at least one logical channel of the multiplexed channels.

In another example aspect of an embodiment of the invention, there is an apparatus, such as a user side apparatus, comprising: at least one memory, the at least one memory comprising computer program code, wherein the computer program code is configured with the at least one processor to cause the apparatus to receive a grant for the data to be communicated, comprising logical channels multiplexed into a medium access control protocol data unit for the data to be communicated, wherein at least one logical channel identifier for at least one logical channel of the multiplexed logical channels and length of at least one logical channel service data unit is configured to be omitted from the medium access control protocol data unit.

A further example aspect of an embodiment of the invention is an apparatus comprising the apparatus of the previous paragraph, the apparatus where the at least one pre-established condition comprises the grant is for use with only one logical channel, and wherein based on the pre-established condition the configuring comprises a logical channel identifier for the one logical channel is omitted from the medium access control protocol data unit; the apparatus where the grant further comprises a Length field of a medium access control subheader set to all zeros to indicate that no more service data units for the at least one logical channel configured to omit logical channel identity will follow; the apparatus where the at least one pre-established condition comprises the identified logical channels being more than one logical channel and only one logical channel of the more than one logical channel has no data to send, and wherein based on the pre-established condition the grant comprises a logical channel identifier for the only one logical channel is omitted, and a one-byte length field is set to all zeros; the apparatus where logical channel identifiers for the more than one logical channels are omitted from the medium access control protocol data unit, wherein the configuring comprises configuring those logical channels in a pre-established order, the apparatus wherein the grant is omitting the length field from the common control channel service data unit of the medium access control protocol data unit; wherein the omitting is based on that a same logical channel identifier is used for common control channel service data units of different sizes; wherein the common control channel service data units of different sizes using the same logical channel identifier are indicated by a random access preamble group identifier; the omitting is based on determining that a grant size for Msg3 meets an exact size criterion of a size of the common control channel service data unit+at least one octet; and the determining that the grant size for Msg3 meets an exact size criterion comprises determining that the common control channel service data unit size plus an R/LCID subheader of the medium access control protocol data unit is equal to Msg3 size; and wherein the common control channel service data unit for the medium access control protocol data unit is configured with several logical channel identifiers linked to different fixed sizes for one or more logical channels of the at least one logical channel of the multiplexed channels.

BRIEF DESCRIPTION OF THE DRAWINGS

The foregoing and other aspects of embodiments of this invention are made more evident in the following Detailed Description, when read in conjunction with the attached figures, wherein.

DETAILED DESCRIPTION

Figure 1:
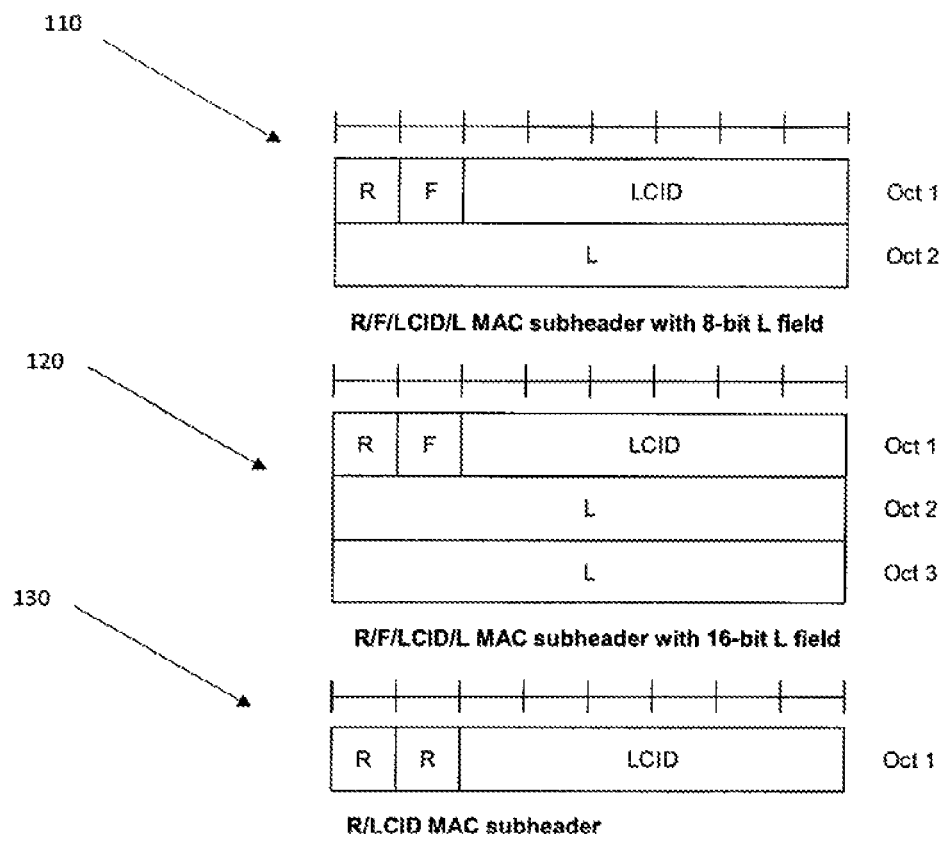
FIG. 1 shows FIG. 6.1.2-1, FIG. 6.1.2-2, and FIG. 6.1.2-3 of 3GPP TS 38.321 V15.1.0 (2018 March)

Example embodiments of the invention relate to a proposed sequence design to at least reduce layer 2 overhead medium access control sub-header for communication, such as but not limited to ultra-reliable low latency communications, to enhance reliability and latency. Further, certain example embodiments of the invention relate to a Random Access procedure carried by MAC protocol in NR, more specifically, this relates to an optimized the MAC PDU structure for Msg3 in the RA procedure from UE to NW. The Msg3 may refer to a message transmitted on UL-SCH containing a C-RNTI MAC CE or CCCH SDU, submitted from upper layer and associated with the UE Contention Resolution Identity, as part of a random access procedure. The Msg 3 in the RA procedure from UE to NW may refer to an uplink transmission scheduled/granted by the NW in a Random Access Response (RAR) message (Msg2) which was sent in response to a Random Access preamble transmission by the UE (Msg1). The RAR may in addition to the uplink grant for Msg3 include information such as timing advance command and Temporary Cell Radio Network Identity (Temporary C-RNTI). The Msg3 may follow a contention resolution message transmission by the NW (Msg 4) which is used by the UE to identify whether the RA procedure was successful.

In an agreement a MAC PDU (protocol data unit) format for DL-SCH and UL-SCH is currently defined as following 3GPP TS 38.321 V15.1.0 (2018 March) which includes one byte LCD and up to two bytes L field for each MAC SDUs and flexible size MAC CEs.

Further, it has been agreed to (e.g., RAN2) that there must be an ability to provide CCCH SDU with 1 octet MAC header (the starting point was 2 with one octet for LCID and one octet for Length field) to be able to get minimum Msg3 size the NW can schedule to 56 bits (1 byte MAC header+6 byte CCCH SDU). This effectively means removing the Length field L from the MAC header. The agreements include that there will be multiple CCCH SDU sizes supported (the sizes below are already accounting the 1 octet MAC header):

RAN2 whether RAN1 can consider support of MSG3 size as follows:

RRC Connection Request: 56 bits (7 bytes), and

RRC Connection Resume Request: 72 bits (9 bytes).

Certain example embodiments of the invention relate to the Random Access procedure carried by MAC protocol in NR. In accordance with an example embodiment of the invention there is proposed how to optimize the MAC PDU structure f or Msg3 in the RA procedure from UE to NW.

In RAN2 #101Bis, the following was agreed:

R2-1805424 Correction to CCCH and msg3 Ericsson CR
    Rel-15 38.321 15.1.0 0071-F NR_newRAT-Core Nokia would like some time to check, and think that CP hasn't decided whether there can be more than one size CCCH. Nokia think we might want BSR etc. as well.

Ericsson think that the current sizes R1 has looked at assumed the MAC header optimization.

VDF think that without this, RRC resume has to be 96 bits and Vodafone think this enhancement is required.

Samsung think this LS indeed indicates the need to enhancement but think we might need an email discussion. LG agrees.

Huawei support this and think we can agree now the Ericsson solution.

Ericsson think that preamble group A and B doesn't cover CCCH.

We will reduce MAC header size for CCCH by 1 octet, FFS exactly how.

As can be seen above, RAN2 agreed we need to be able to provide CC CH SDU with 1 octet MAC header (the starting point was 2 with one octet for LCID and one octet for Length field) to be able to get minimum Msg3 size the NW can schedule to 56 bits (1 byte MAC header+6 byte CCCH SDU). This effectively means removing the Length field L from the MAC header.

RAN2 also agreed that there will be multiple CCCH SDU sizes supported (R2-1806501):

RAN2 therefore kindly ask whether RAN1 can consider support of MSG3 size as follow:

RRC Connection Request: 56 bits (7 bytes), and

RRC Connection Resume Request: 72 bits (9 bytes).

One proposal how to optimize the header to 1 byte was given in the above contribution R2-1805424:

An additional LCID is added which the MAC Entity uses for CCCH when there is only one MAC subPDU in the MAC PDU. The L field is not included in this case.

However, this proposal does not work in practice as described since when the UL grant for Msg3 is exactly CCCH SDU size+2 bytes, the receiver will assume the CCCH SDU size is the actual CCCH SDU size+1 byte and an error will occur. Also, in case we have CCCH SDU sizes of 1 byte difference, e.g. with CCCH SDU sizes of 6 bytes and 7 bytes, with a grant size of 8 bytes, the gNB would not be able to distinguish R/F/LCID/L+6 bytes SDU or R/R/LCID+7 bytes SDU since they both have single MAC subPDU. Furthermore, immediately after we have grant bigger than the CCCH SDU+1 byte header field, we lose the possibility to optimize the header with 1 byte which seems inefficient.

A table of interpretation of the MAC sub-headers depending on the different grant size was analyzed in R2-1805415. It is problematic when we have different CCCH SDU sizes to be supported (e.g. 6 bytes and 8 bytes). With a grant size of 9 bytes, the receiver will not be able to distinguish between R/F/LCID/L+6 bytes CCCH SDU+padding, or R/R/LCID+8 bytes CCCH SDU.

At least one problem exists in how to optimize the MAC PDU for RA procedure Msg3. Example embodiments of the invention work to reduce MAC header size for CCCH by 1 octet, FFS exactly how.

Further, as indicted in Figure section 6.1.2 of 3GPP TS 38.321 MAC P DU (DL-SCH and UL-SCH except transparent MAC and Random Access Response, a MAC PDU consists of one or more MAC subPDUs. The MAC SDUs are of variable sizes. Each MAC subPDU consists of one of the following:

A MAC subheader only (including padding);

A MAC subheader and a MAC SDU;

A MAC subheader and a MAC CE; and

A MAC subheader and padding.

The LCID field is 6 bits and is indicating a logical channel ID. There is one LCID field per MAC subheader. The L Field is indicating the length of the corresponding MAC SDU or variable-sized MAC CE in bytes. There is one L field per MA C subheader except for subheaders corresponding to fixed-sized MAC CEs and padding. The size of the L field is indicated by the F field. The F field is a 1 bit 'Format' field indicating a size of the Length field where 0 indicates 8 bits and 1 indicates 16 bits of the Length field. There is one F field per MAC subheader, except for subheaders corresponding to fixed-sized MAC CEs and padding.

Each MAC subheader corresponds to either a MAC SDU, a MAC CE, or padding. A MAC subheader except for fixed sized MAC CE and padding consists of the four header fields R/F/LCID/L. A MAC subheader for fixed sized MAC CE and padding consists of the two header fields R/LCID.

As shown in FIG. 1, there is an R/F/LCID/L MAC subheader 110 with 8-bit L field, an R/F/LCID/L MAC subheader 120 with 16-bit L field, and a an R/LCI D MAC subheader 110 with 8-bit L field. It is noted that these fields can be used to an advantage in accordance with example embodiments of the invention.

Figure 2A:
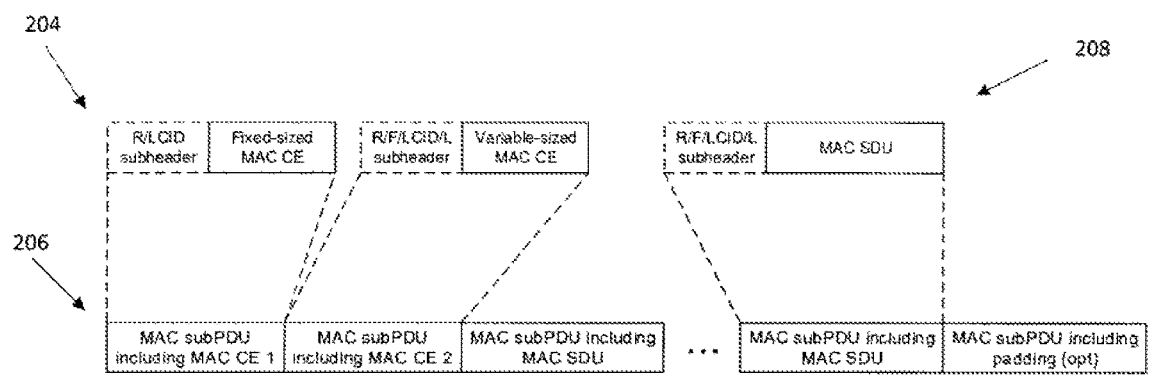
FIG. 2A and FIG. 2B show FIGS. 6.1.2-4 and 6.1.2-5, respectively, of 3GPP TS 38.321 V15.1.0 (2018 March)
Figure 2B:
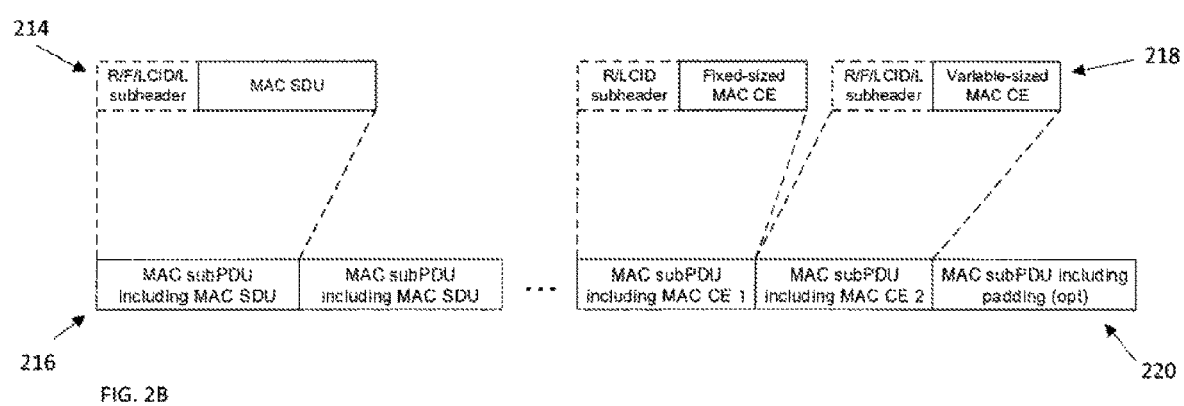

FIG. 2A and FIG. 2B show at least a MAC PDU format. FIG. 2A shows an example of a DL MAC PDU and FIG. 2B shows an example of a UL MAC PDU.

Figure 6:
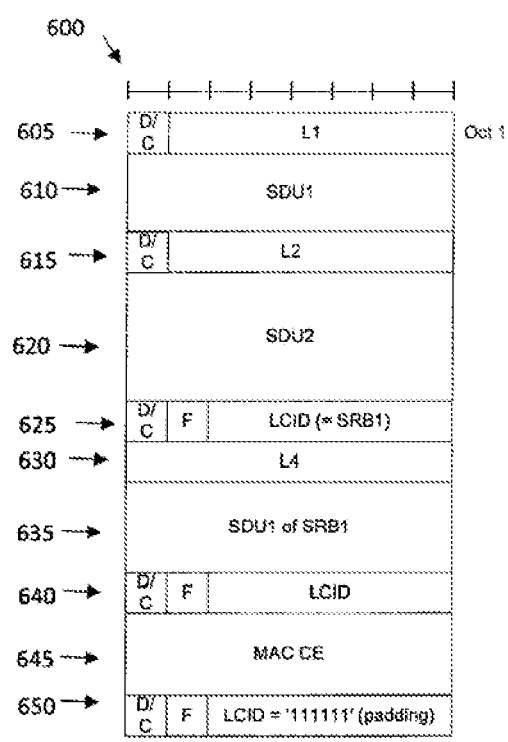

As shown in FIG. 2A and FIG. 2B MAC CEs are placed together. DL MAC subPDU (s) 204 and 208 or 214 and 218 with MAC CE (s) 206 or 216 is placed before any MAC subPDU 210 or 220 with MAC SDU and MAC subPDU with padding as depicted in FIG. 6.1.2-4. UL MAC subPDU (s) with MAC CE (s) is placed after all the MAC subPDU (s) with MAC SDU and before the MAC subPDU with padding in the MAC PDU as depicted in FIG. 6.1.2-5. The size of padding can be zero.

The Logical Channel Prioritization procedure is applied whenever a new transmission is performed.

As indicated in 3GPP TS 38.321 section 5.4.3.1.1RRC controls the scheduling of uplink data by signaling for each logical channel per MAC entity:

priority where an increasing priority value indicates a lower priority level;

prioritisedBitRate which sets the Prioritized Bit Rate (PBR);

bucketSizeDuration which sets the Bucket Size Duration (BSD); and

RRC additionally controls the LCP procedure by configuring mapping restrictions for each logical channel:

allowedSCS-List which sets the allowed Subcarrier Spacing (s) for transmission;

maxPUSCH-Duration which sets the maximum PUSCH duration allowed for transmission;

configuredGrantTypelAllowed which sets whether a Configured Grant Type 1 can be used for transmission;

allowedServingCells which sets the allowed cell (s) for transmission.

There is also transparent mode defined for MAC which does not contain any header for BCCH. It would not be applicable for URLLC service as we still need to multiplex multiple MAC SDUs into one TB.

For URLLC, it is desirable to reduce overhead as much as possible to enhance reliability. With the introduction of LCP restrictions, when certain type of grant can be configured for use of one URLLC LCH only, LCID in the MAC subheader becomes redundant to indicate different LCHs in such case. However, for certain scenarios, LCID should still be able to be indicated, e.g., LCDs for MAC CEs need still to be supported or SRB data is desirable to be multiplexed in any grant type.

One example embodiment of the invention relates to operations to determine when not to signal an LCID of an LCH or some LCHs when a grant, such as a URLLC grant, fulfils some pre-established condition. There are three main alternatives allowing different levels of flexibility.

Another example embodiment of the invention relates to MAC PDU operations where the Length field for CCCH SDU by the UE is not indicated when it meets an exact size criterion, for instance, 6 bytes. Based on the LCID for CCCH SDU, a NW entity can determine a CCCH SDU size. FIG. 8B as discussed above shows a MAC subheader that can be determined to meet the exact size criterion for related operations as in accordance with the example embodiments of the invention.

Figure 10:
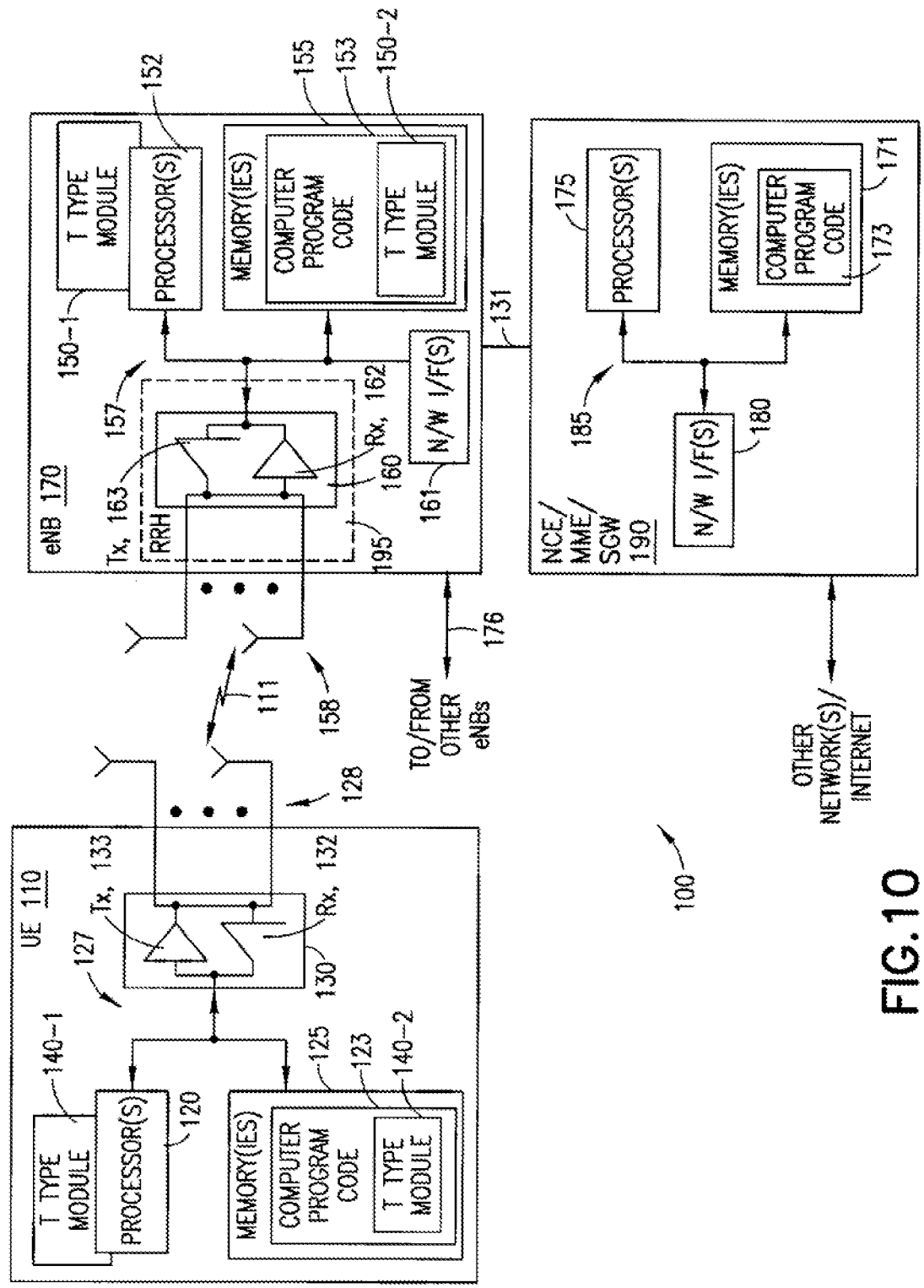
FIG. 10 shows a high level block diagram of various devices used in carrying out various aspects of the invention.

Before describing the example embodiments of the invention in further detail reference is made to FIG. 10. FIG. 10 shows a block diagram of one possible and non-limiting exemplary system in which the exemplary embodiments may be practiced. In FIG. 10, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a T Type module 140 which is configured to perform the example embodiments of the invention as described herein. The T Type module 140 comprising one of or both parts 140-1 and/or 140-2, which may be implemented in a number of ways. The T Type module 140 may be implemented in hardware as T Type module 140-1, such as being implemented as part of the one or more processors 120. The T Type module 140-1 may be implemented also as an integrated circuit or through other hardware such as a programmable gate array. In another example, the T Type module 140 may be implemented as T Type module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F (s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a T Type module 150 which is configured to perform example embodiments of the invention as described herein. The T Type module 150 comprising one of or both parts 150-1 and/or 150-2, which may be implemented in a number of ways. The T Type module 150 may be implemented in hardware as T Type module 150-1, such as being implemented as part of the one or more processors 152. The T Type module 150-1 may be implemented also as an integrated circuit or through other hardware such as a programmable gate array. In another example, the T Type module 150 may be implemented as T Type module 150-2, which is implemented as computer program code 153 and is executed by the one or more processors 152. For instance, the one or more memories 155 and the computer program code 153 are configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an Si interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 maybe means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 10. A computer-readable medium may comprise a computer-readable storage medium or other device that may be any media or means that can contain or store the instructions for use by or in connection with an instruction execution system, apparatus, or device, such as a computer.

In a first alternative in accordance with an example embodiment of the invention, it is assumed that a grant type is configured to be used for one and only one LCH: no LCIDs for the MAC SDUs for that one logical channel are indicated.

Figure 3:
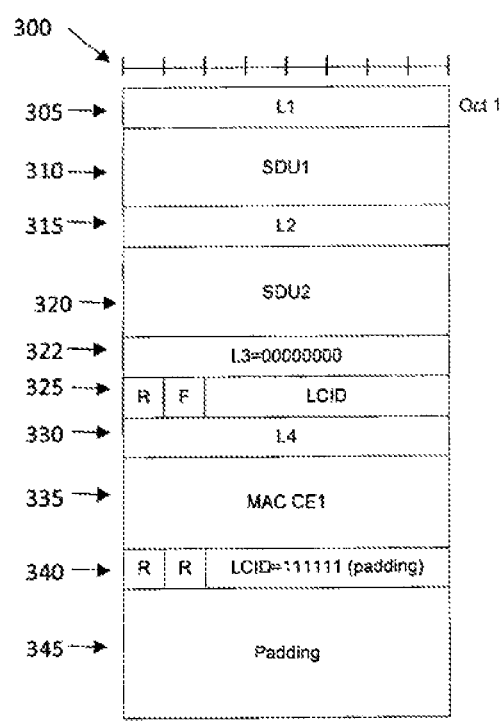
FIG. 3, FIG. 4, FIG. 5, FIG. 6, and FIG. 7 each shows a MAC header format example in accordance with an example embodiment of the invention.

FIG. 3 shows a MAC subheader format example for the first alternative in accordance with an example embodiment of the invention as stated above. As shown in FIG. 3 there is an 8 bit segment 300. In this segment there is an L1 305; an SDU1 310; an L2 315; an SDU2 320; L3 value 322; an R, F, LCID 325; an L4 330; a MAC CE1 335; an R, R, LCID value (padding) 340; and padding 345.

In this situation the possible options can include to indicate the presence of MAC SDU or MAC CE or no presence as follows:
  Option 1: Each MAC SDU has one-byte L field. L field with all zero values indicate no more SDUs follow. LCID for MAC CE (if any) follows after that.
  Option 2: One bit D/C field indicates a 7 bits L field follows or LCID for MAC CE follows.
The receiver then relies on the grant type to identify which LCH is being carried (if any).

In a second alternative in accordance with an example embodiment of the invention, it is assumed that a grant type is configured to be used for several LCHs but only one can be conveyed without LCID (hereafter referred to as LCID skip). If that LCH does not have any data to send, the first L field will then signal a size of 0; or if that LCH does not have enough data to send to fill up the whole grant, an L field will signal a size of 0 after the data multiplexed. The LCH for LCID skip is to be multiplexed first in the MAC PDU.

Figure 4:
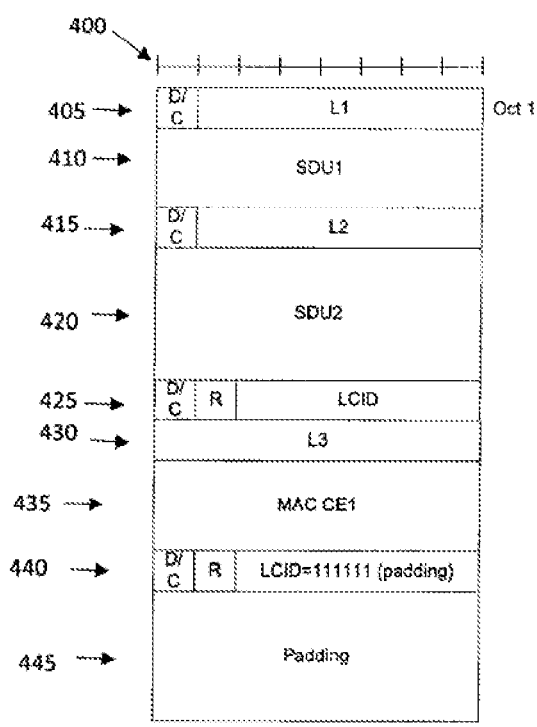

FIG. 4 shows a MAC subheader format example for the second alternative in accordance with an example embodiment of the invention as stated above using a D/C field to indicate whether L field follows or LCID follows. As shown in FIG. 4 there is an 8 bit segment 400. In this segment there is an DC, L1 405; an SDU1 410; a D/C L2 415; an SDU2 420; D/C R LCID 425; L3 value 430; a MAC CE1 435; a D/C R LCID value (padding) 440; and padding 445.

As shown in FIG. 4, a MAC subheader is the main overhead for URLLC data with RLC UM as there is only one-byte header in RLC if the RLC SDU is not segmented. L field of 8 bits or 7 bits could be enough esp. considering the URLLC data are typically with small packet size. Even if not fit for some rare cases, it can be segmented in RLC.

Figure 5:
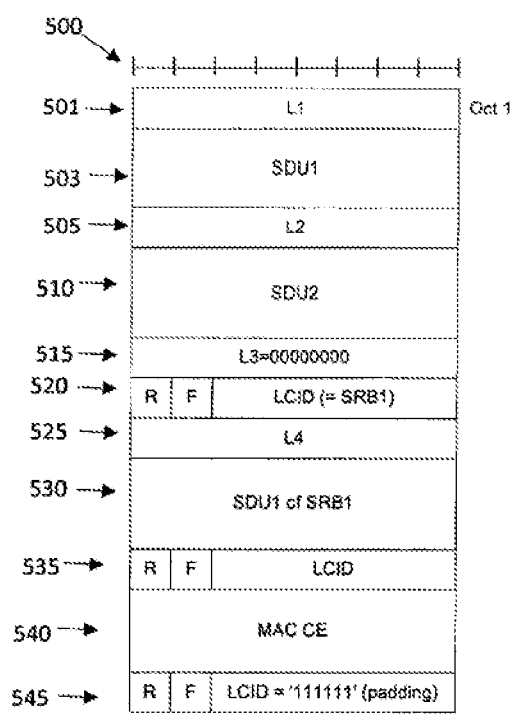

FIG. 5 shows another MAC subheader format example for a first option of the second alternative in accordance with an example embodiment of the invention as stated above. The MAC SDUs and MAC CEs with LCID follows the L field with all 0 values after the MAC SDUs for the LCH with LCID skip. As shown in FIG. 5 there is an 8 bit segment 500. In this segment there is an L1 501; an SDU1 503; an L2 505; an SDU2 510; L3 value 515; an R, F, LCID (=SRB2) 520; an L4 525; SDU1 of SRB1 530; R F LCID 535; and a MAC CE 540; an R, F, LCID value (padding) 545.

FIG. 6 shows another MAC subheader format example for a second option of the second alternative in accordance with an example embodiment of the invention as stated above with a D/C field indicating whether L field follows or LCID follows. As shown in FIG. 6 there is an 8 bit segment 600. In this segment there is a D/C L1 605; an SDU1 610; an L2 615; an SDU2 620; D/C F LCID (=SRB1) 625; L4 630; SDU1 of SRB1 635; D/C F LCID 640; a MAC CE1 645; an D/C F LCID value (padding) 650.

In a third alternative in accordance with an example embodiment of the invention, it is assumed that a grant type is configured to be used for several LCHs and a subset of the LCH can make use of that grant in a pre-established order. When those LCH have no data to send, the first L fields will then signal 0. In addition, signaling an L field of 0 could indicate the start of the next LCH with LCID skip configured.

Figure 7:
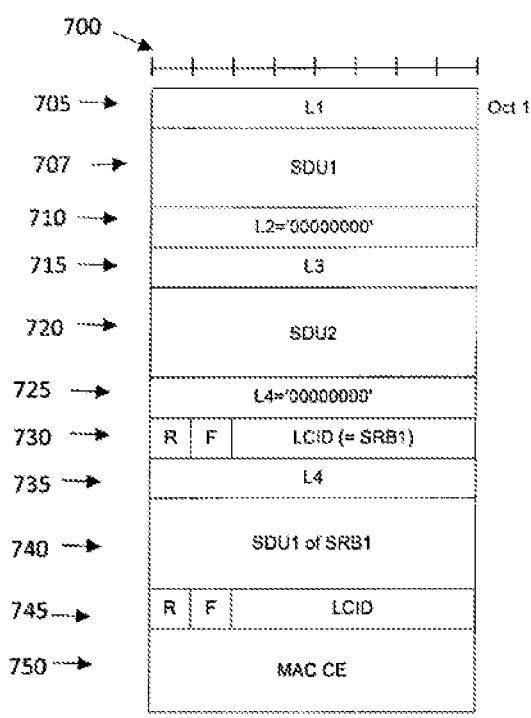

FIG. 7 shows another MAC subheader format example for a third alternative of first option in accordance with an example embodiment of the invention as stated above. As shown in FIG. 7 there is an 8 bit segment 700. In this segment there is an L1 705; an SDU1 707; an L2 value 710; L3 715; an SDU2 720; L4 value 725; an R, F, LCID (=SRB1) 730; an L4 735; SDU1 of SRB1 740; an R, F, LCID 745; and MAC CE 750.

In this example as shown in FIG. 7, two LCHs are configured with LCID skip. L2 of all zero values after all the SDUs of the first LCH with LCID skip has been included, indicating starting of SDUs of the second LCH configured with LCID skip. L4 of all zero values after all SDU of the second LCH with LCID skip has been included, indicating starting of SDUs for other LCHs without LCID skip and MAC CEs.

In both the second and third alternative embodiments as described above, the can be used a same operation to indicate MAC SDUs/MAC CEs as for the first embodiment. D/C field in option 2 could be interpreted as an LCH with LCID skip configured or an LCH with LCID skip not configured follows, or could be called as Skipping field which indicating if LCID follows or L follows for the SDU/MAC CE.

The overhead increase when the LCH (s) configured with LCID skip have no data to send is considered as acceptable since in typical scenarios, it is assumed that they will have data to send. For instance, a contention-based resource will primarily be dedicated to URLLC services. The occurrence of SRB data will be less frequent and more tolerant to the possible latency increase due to overhead.

In the $2^{nd}$ and $3^{rd}$ alternatives, to minimize the impacts on logical channel prioritization (LCP), it is also suggested that when a higher priority logical channel for which LCID skip is not configured needs to be transmitted, the first L field (s) corresponding to the LCH configured with LCID skip will always signal size 0 regardless of whether data for that LCH can be included later in the MAC PDU i.e. after the data from the higher priority logical channels. In other words, the MAC PDU will always contain data in strict order of priority as instructed by LCP and if one LCH configured with LCID skip cannot be included first, the corresponding L at the beginning of the PDU will signal 0 size, regardless of whether data from that LCH can be included after the LCH of higher priority (in which case an LCID will be used), see FIG. 8.

Figure 8A:
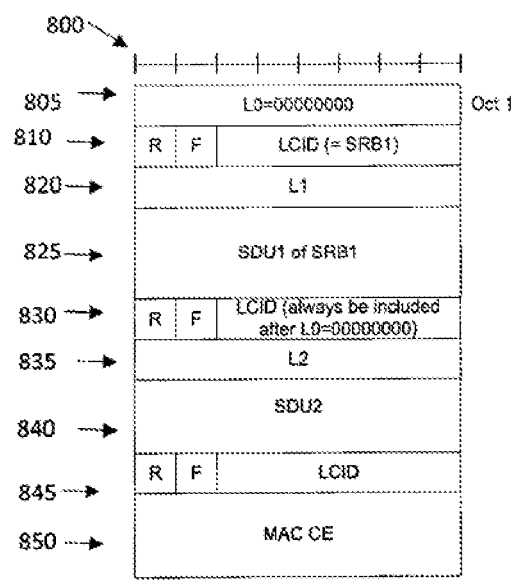
FIG. 8A shows where LCD is included if the LCH is configured with LCID skipping e.g., if SRB is put before, in accordance with an example embodiment of the invention.
Figure 8B:
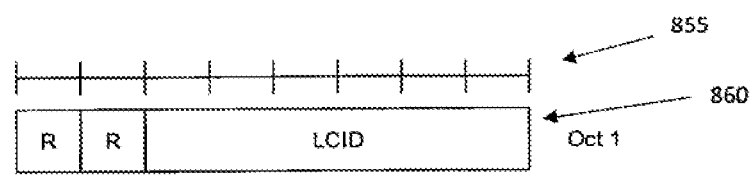
FIG. 8B shows FIG. 6.1.2-3 of 3GPP TS 38.321 V15.1.0 (2018 March)

FIG. 8A shows, as described herein, where LCID if the LCH is configured with LCID skipping e.g., if SRB is put before. As shown in FIG. 8A there is an 8 bit segment 800. In this segment there is an L0 value 805; an R, F, LCID (=SRB1) 810; L1 820; SDU1 of SRB1 825; R, F, LCID (always be included after L0=00000000) 830; L2 835; an SDU2 840; an R, F, LCID 845; and MAC CE 850.

To ensure backward compatibility, RRC configures if the new format or legacy format with always LCID is used.

Additionally, 2-byte or 16 bits L field for Option 1 and Option 2 above, respectively, could be configured via RRC signaling. Or a one-bit F field could be added to the L field octet to indicate 7 bits or 15 bits L field.

In another alternative in accordance with the example embodiment of the invention, a length field for CCCH SDU by a UE is not indicated when it meets an exact size criterion, for instance as a non-limiting example, 6 bytes. Based on the LCID for CCCH SDU, NW can determine the CCCH SDU size.

In another alternative, the same LCID for CCCH SDUs of multiple sizes (e.g., 6 and 8 bytes) is used. The UE will use Random Access preamble group B when it has CCCH SDU of bigger size to transmit, and uses preamble group A otherwise. NW can de-multiplex the MAC PDU with different CCCH SDU sizes indicated by the same LCID by the preamble group used for the request, hence L field can be always omitted for CCCH regardless of given grant size allocated for the Msg3 transmission.

In still another alternative, in case variable sized CCCH SDU needs to be also supported, different LCID can be used for that purpose (instead of based on single or multiple subPDU in the MAC PDU comparing to prior art). This will ensure that the L field can also be omitted also for variable sized CCCH SDU in case it meets the exact size criterion as proposed above. That is, whenever the fixed variable sized CCCH SDU has different size from the exact size required for the first LCD, it will use the second LCID to indicate this in which case the L field is indicated in the MAC subheader.

In yet another alternative, the network links several LCID to fixed sizes for one or several logical channels through RRC configuration. For instance, LCID α is reserved for LCH A for 6 bytes, LCID β is reserved for LCH A for 8 bytes, LCID χ for LCH B for 10 bytes and LCID δ is reserved for LCH C for 13 bytes. When used for CCCH the configuration would be broadcast. When used for radio bearers, the signaling would be sent in a dedicated manner.

In yet another alternative, a length field for CCCH SDU by UE is not indicated when the grant for Msg3 meets an exact size criterion, for instance as a non-limiting example, the grant size for Msg3 is exactly CCCH SDU size+1 octet. It is noted that in accordance with another example embodiment of the invention at least this size criterion may be determined to be met based on the grant size for Msg3 being the CCCH SDU size+at least on 1 octet. This is indicated by a LCID as above which consumes the 1 additional octet on top of the CCCH SDU size. In other cases (i.e., when the grant for Msg3 does not meet the exact size criterion), a different LCID could be used to indicate a length field will follow after the LCD. In regards to this alternative there can be determining that the common control channel service data unit size plus an R/LCID subheader of the medium access control protocol data unit is equal to Msg3 size or meets an exact size criterion.

FIG. 8B shows FIG. 6.1.2-3 of 3GPP TS 38.321 V15.1.0 (2018 March). As shown in FIG. 8B there is a MAC R/LCID subheader 855 with an 8 bit header field consisting of 3 fields R, R, and LCID of Oct 1 860.

This MAC subheader as shown in FIG. 8B represents one type of MAC subheader that may be used to perform at least operations related to the exact criterion of CCCH SDU operations as described herein in accordance with the example embodiments.

Figure 8C:
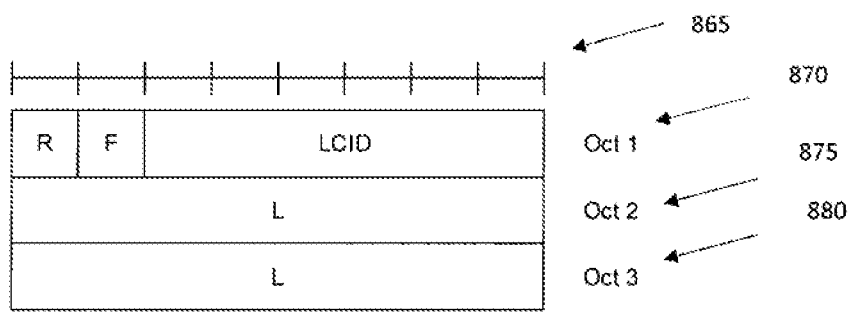
FIG. 8C shows FIG. 6.1.2-1 of 3GPP TS 38.321 V15.1.0 (2018 March)

FIG. 8C shows FIG. 6.1.2-2 of 3GPP TS 38.321 V15.1.0 (2018 March). As shown in FIG. 8C there is a MAC R/F/LCID/L subheader 865 with an 8 bit header field consisting of 3 fields R, F, and LCID of Oct 1 870, and 16 bit L field of Oct 2 875 and Oct 3 880.

Figure 8D:
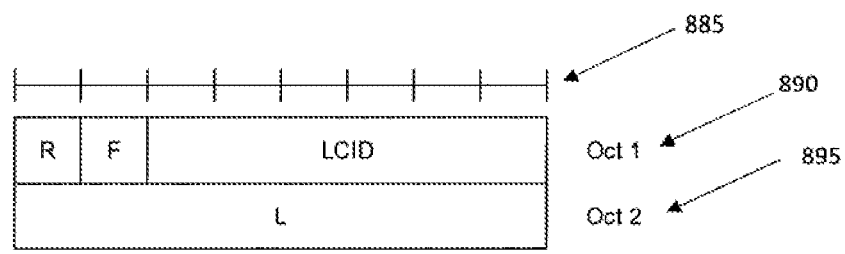
FIG. 8D shows FIG. 6.1.2-2 of 3GPP TS 38.321 V15.1.0 (2018 March)

FIG. 8D shows FIG. 6.1.2-1 of 3GPP TS 38.321 V15.1.0 (2018 March). As shown in FIG. 8B there is an MAC R/F/LCID/L subheader 885 with an 8 bit header field consisting of 3 fields R, F, and LCID of Oct 1 890, and an 8 bit L field of Oct 2 895.

These types of MAC subheaders as shown in FIG. 8C and FIG. 8D each can represent a type of MAC subheader that may be used to perform at least operations related to whether or not exact criterion or other criterion of CCCH SDU operation s as described herein in accordance with the example embodiments.

A MAC PDU is a bit string that is byte aligned (i.e., multiple of 8 bits) in length. In the MAC subheader bit a string order of each parameter field within a MA C PDU is represented with the first and most significant bit in the leftmost bit and the last and least significant bit in the rightmost bit. A MAC SDU is a bit string that is byte aligned (i.e., multiple of 8 bits) in length. A MAC SDU is included into a MAC PDU from the first bit onward. A MAC CE is a bit string that is byte aligned (i.e., multiple of 8 bits) in length. A MAC subheader is a bit string that is byte aligned (i.e., multiple of 8 bits) in length. Each MAC subheader is placed immediately in front of the corresponding MAC SDU, MAC CE, or padding.

Unlike in prior art and its submissions, e.g., which can require MAC specification changes to build a MAC PDU where MAC entity takes CCCH SDU size into account, in accordance with example embodiments of the invention the L field can always be omitted such as for CCCH SDU regardless of grant size given, e.g., for Msg3 transmission. Further, in accordance with example embodiments of the invention there is a possibility to skip L field data to logical channel (s) beyond CCCH.

Benefits of at least these novel operations in accordance with the example embodiments include that the length field for the CCCH SDU can be removed regardless of the size of grant the UE will receive for Msg3 transmission (unlike in prior art proposals), and that with an addition of, and based on, a preamble group, operations are simplified and only one LCID is required to support 2 or more fixed sized CCCH SDUs (unlike in prior art proposals where 2 LCIDs were always required).

Figure 9A:
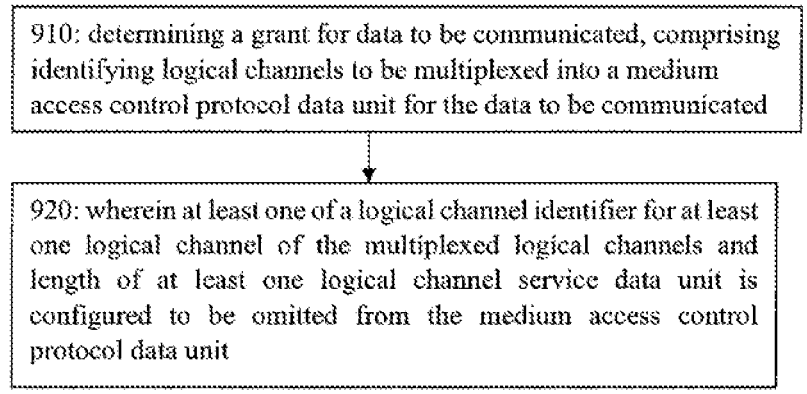
FIGS. 9A and 9B each show a method in accordance with example embodiments of the invention which may be performed by an apparatus.

FIG. 9A illustrates operations which may be performed by a network device such as, but not limited to, a network node gNB 170 as in FIG. 10 or an access node such as a base station. As shown in step 910 of FIG. 9A determining a grant for data to be communicated, comprising identifying logical channels to be multiplexed into a medium access control protocol data unit for the data to be communicated. Then as shown in step 920 of FIG. 9A there is, wherein at least one of a logical channel identifier for at least one logical channel of the multiplexed logical channels and length of at least one logical channel service data unit is configured to be omitted from the medium access control protocol data unit.

In accordance with the example embodiments as described in the paragraph above, the at least one pre-established condition comprises the grant is for use with only one logical channel, and wherein based on the pre-established condition the grant comprises a logical channel identifier for the one logical channel is omitted from the medium access control protocol data unit.

In accordance with the example embodiments as described in the paragraphs above, the grant further comprises a Length field of a medium access control subheader is set to all zeros to indicate that no more service data units for the at least one logical channel configured to omit logical channel identity will follow.

In accordance with the example embodiments as described in the paragraphs above, the grant further comprises a one bit data control field is set to indicate that one of a Length field follows for a service data unit of a logical channel configured with logical channel identity omit, or a logical channel identifier subheader follows for at least one of a control element or a service data unit of a logical channel not configured with omitted logical channel identity.

In accordance with the example embodiments as described in the paragraphs above, the at least one pre-established condition comprises the identified logical channels being more than one logical channel and only one logical channel of the more than one logical channel has no data to send, and wherein based on the pre-established condition the grant comprises a logical channel identifier for the only one logical channel is omitted, and a one-byte length field is set to all zeros.

In accordance with the example embodiments as described in the paragraphs above, wherein logical channel identifier for more than one logical channels configured to be omitted from the medium access control protocol data unit, wherein the grant comprises those logical channels in a pre-established order.

In accordance with the example embodiments as described in the paragraphs above, there is determining a subset of the more than one logical channel with no data to send; and based on the determining, configuring a Length to be set to all zeros to indicate a start of a next logical channel without a logical channel identifier for the subset of the more than one logical channel.

In accordance with the example embodiments as described in the paragraph above, the data to be communicated comprises ultra-reliable low latency communication type data.

In accordance with the example embodiments as described in the paragraphs above, the one logical channel having no data to send is multiplexed first into a medium access control protocol data unit associated with at least one medium access control subheader for communicating.

In accordance with the example embodiments as described in the paragraphs above, logical channel identifiers for more than one logical channel is omitted from the medium access control protocol data unit, wherein the grant comprises a subset of the more than one logical channel in a pre-established order.

In accordance with the example embodiments as described in the paragraphs above, there is determining that the subset of the more than one logical channel has no data to send; and based on the determining, configuring a one-byte Length to be set to all zeros to indicate a start of a next logical channel without a logical channel identifier for the subset of the more than one logical channel.

In accordance with the example embodiments as described in the paragraphs above, there is omitting the length field from the common control channel service data unit of the medium access control protocol data unit.

In accordance with the example embodiments as described in the paragraphs above, the omitting is based on determining that a length field for the common control channel service data unit of the medium access control meets an exact size criterion.

In accordance with the example embodiments as described in the paragraphs above, the omitting is based on determining that a same logical channel identifier is used for common control channel service data units of different sizes.

In accordance with the example embodiments as described in the paragraphs above, the common control channel service data units of different sizes using the same logical channel identifier are indicated by a random access preamble group identifier.

In accordance with the example embodiments as described in the paragraphs above, the omitting is based on determining that a grant size for Msg3 meets an exact size criterion of a size of the common control channel service data unit+at least one octet.

In accordance with the example embodiments as described in the paragraphs above, the determining that the grant size for Msg3 meets an exact size criterion comprises determining that the common control channel service data unit size plus an R/LCID subheader of the medium access control protocol data unit is equal to Msg3 size.

In accordance with the example embodiments as described in the paragraphs above, and wherein the common control channel service data unit for the medium access control protocol data unit is configured with several logical channel identifiers linked to different fixed sizes for one or more logical channels of the at least one logical channel of the multiplexed channels.

In accordance with an example embodiment of the invention as described above there is an apparatus comprising: means for determining (Memory (ies) 155 storing Computer Program Code 153 executed by Processors 152 and/or T Type Module 150-1 and/or T Type Module 150-2 as in FIG.

10) a grant for data to be communicated, comprising identifying logical channels to be multiplexed (Memory (ies) 155 storing Computer Program Code 153 executed by Processors 152 and/or T Type Module 150-1 and/or T Type Module 150-2 as in FIG. 10) into a medium access control protocol data unit for the data to be communicated; and wherein at least one of logical channel identifier for at least one logical channel of the multiplexed logical channels and length of at least one logical channel service data unit is configured to be omitted (Memory (ies) 155 storing Computer Program Code 153 executed by Processors 152 and/or T Type Module 150-1 and/or T Type Module 150-2 as in FIG. 10) from the medium access control protocol data unit.

In the example aspect of the invention according to the paragraph above, wherein at least the means for determining, identifying, and omitting comprises a non-transitory computer readable medium [Memory (ies) 155 as in FIG. 10] encoded with a computer program [Computer Program Code 153 as in FIG. 10] executable by at least one processor [Processors 152 and/or T Type Module 150-1 and/or T Type Module 150-2 as in FIG. 10].

Figure 9B:
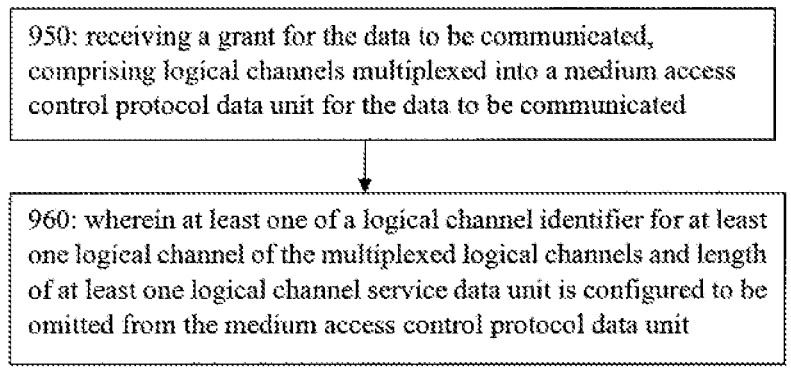

FIG. 9B illustrates operations which may be performed by a network device such as, but not limited to, a user equipment such as a UE 110 as in FIG. 10. As shown in step 950 there is receiving a grant for the data to be communicated, comprising logical channels multiplexed into a medium access control protocol data unit for the data to be communicated; then as shown in step 960 of FIG. 9B there is wherein at least one of a logical channel identifier for at least one logical channel of the multiplexed logical channels and length of at least one logical channel service data unit is configured to be omitted from the medium access control protocol data unit.

In accordance with the example embodiments as described in the paragraph above, the at least one pre-established condition comprises the grant is for use with only one logical channel, and wherein based on the pre-established condition the grant comprises a logical channel identifier for the one logical channel is omitted from the medium access control protocol data unit.

In accordance with the example embodiments as described in the paragraphs above, the grant further comprises a Length field of a medium access control subheader set to all zeros to indicate that no more service data units for the at least one logical channel configured to omit logical channel identity will follow.

In accordance with the example embodiments as described in the paragraphs above, the at least one pre-established condition comprises the identified logical channels being more than one logical channel and only one logical channel of the more than one logical channel has no data to send, and wherein based on the pre-established condition the grant comprises a logical channel identifier for the only one logical channel is omitted, and a one-byte length field is set to all zeros.

In accordance with the example embodiments as described in the paragraphs above, logical channel identifiers for the more than one logical channels are omitted from the medium access control protocol data unit, wherein the grant comprises those logical channels in a pre-established order.

In accordance with the example embodiments as described in the paragraph above, the data to be communicated comprises an ultra-reliable low latency communication type logical data.

In accordance with the example embodiments as described in the paragraphs above, the at least one pre-established condition comprises the grant type is for use with only one logical channel, and wherein based on the pre-established condition the grant type comprises a logical channel identifier for the one logical channel is omitted from the medium access control protocol data unit.

In accordance with the example embodiments as described in the paragraphs above, the grant type further comprises a one bit data control field is set to indicate that one of a seven bit Length field follows for the service data unit of the logical channel configured with logical channel identity omit, or a logical channel identifier subheader follows for at least one of a control element or a service data unit of a logical channel with an omitted logical channel identity.

In accordance with the example embodiments as described in the paragraphs above, the one logical channel having no data to send is multiplexed first into a medium access control protocol data unit associated with at least one medium access control subheader for communicating.

In accordance with the example embodiments as described in the paragraphs above, logical channel identifiers for more than one logical channel is omitted from the medium access control protocol data unit, wherein the grant type comprises a subset of the more than one logical channel in a pre-established order, and a one-byte Length to be set to all zeros to indicate a start of a next logical channel without a logical channel identifier for the subset of the more than one logical channel.

In accordance with the example embodiments as described in the paragraphs above, the grant is omitting the length field from the common control channel service data unit of the medium access control protocol data unit.

In accordance with the example embodiments as described in the paragraphs above, the omitting is based on that a same logical channel identifier is used for common control channel service data units of different sizes.

In accordance with the example embodiments as described in the paragraphs above, the common control channel service data units of different sizes using the same logical channel identifier are indicated by a random access preamble group identifier.

In accordance with the example embodiments as described in the paragraphs above, the omitting is based on determining that a grant size for Msg3 meets an exact size criterion of a size of the common control channel service data unit+at least one octet.

In accordance with the example embodiments as described in the paragraphs above, the determining that the grant size for Msg3 meets an exact size criterion comprises determining that the common control channel service data unit size plus an R/LCID subheader of the medium access control protocol data unit is equal to Msg3 size.

In accordance with the example embodiments as described in the paragraphs above, and wherein the common control channel service data unit for the medium access control protocol data unit is configured with several logical channel identifiers linked to different fixed sizes for one or more logical channels of the at least one logical channel of the multiplexed channels.

In accordance with an example embodiment of the invention as described above there is an apparatus comprising: means for receiving (one or more transceivers 130 and one or more antennas 128, Memory (ies) 125 storing Computer Program Code 123 executed by Processors 120 and/or T Type Module 140-1 and/or T Type Module 140-2 as in FIG. 10) a grant for data to be communicated (one or more transceivers 130 and one or more antennas 128, Memory (ies) 125 storing Computer Program Code 123 executed by Processors 120 and/or T Type Module 140-1 and/or T Type Module 140-2 as in FIG. 10), comprising logical channels multiplexed into a medium access control protocol data unit for the data to be communicated; wherein at least one of a logical channel identifier for at least one logical channel of the multiplexed logical channels and length of at least one logical channel service data unit is configured to be omitted (Memory (ies) 125 storing Computer Program Code 123 executed by Processors 120 and/or T Type Module 140-1 and/or T Type Module 140-2 as in FIG. 10) from the medium access control protocol data unit.

In the example aspect of the invention according to the paragraph above, wherein at least the means for receiving comprises one or more transceivers 130 and one or more antennas 128 and a non-transitory computer readable medium [Memory (ies) 125 as in FIG. 10] encoded with a computer program [Computer Program Code 123 as in FIG. 10] executable by at least one processor [Processors 120 and/or T Type Module 140-1 and/or T Type Module 140-2 as in FIG. 10].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of embodiments of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method comprising:
   determining a grant for data to be communicated, wherein the determining comprises identifying one or more logical channels to be multiplexed into a medium access control protocol data unit for the data to be communicated,
   wherein a length field of at least one logical channel service data unit is configured to be omitted from the medium access control protocol data unit, wherein the length field is omitted based on determining that the logical channel service data unit is a common control channel service data unit of the medium access control protocol data unit, wherein multiple logical channel identifiers are linked to different fixed sizes such that a logical channel identifier is configured to indicate a respective size of the common control channel service data unit.

2. The method of claim 1, wherein a logical channel identifier for at least one logical channel of the multiplexed logical channels is configured to be omitted from the medium access control protocol data unit, the method further comprising:
   determining that the grant is fulfilling at least one pre-established condition, wherein the at least one pre-established condition comprises the grant is for use with only one logical channel, and wherein based on the pre-established condition the grant comprises a logical channel identifier for the one logical channel is omitted from the medium access control protocol data unit.

3. The method of claim 2, wherein the grant further comprises a Length field of a medium access control subheader is set to all zeros to indicate that no more service data units for the at least one logical channel configured to omit logical channel identity will follow.

4. The method of claim 2, wherein the grant further comprises a one bit data control field is set to indicate that one of a Length field follows for a service data unit of a logical channel configured with logical channel identity omit, or a logical channel identifier subheader follows for at least one of a control element or a service data unit of a logical channel not configured with omitted logical channel identity.

5. The method of claim 2, wherein the at least one pre-established condition comprises the identified logical channels being more than one logical channel and only one logical channel of the more than one logical channel has no data to send, and wherein based on the pre-established condition the grant comprises a logical channel identifier for the only one logical channel is omitted, and a one-byte length field is set to all zeros.

6. The method of claim 2, wherein the logical channel identifier for more than one logical channel is configured to be omitted from the medium access control protocol data unit, wherein the grant comprises those logical channels in a pre-established order.

7. The method of claim 2, further comprising:
determining a subset of the more than one logical channel with no data to send; and
based on the determining, configuring a Length to be set to all zeros to indicate a start of a next logical channel without a logical channel identifier for the subset of the more than one logical channel.

8. The method of claim 1, wherein the length field is omitted based on determining that the length field for the common control channel service data unit meets an exact size criterion.

9. The method of claim 1, wherein the length field is omitted based on at least one of determining that a same logical channel identifier is used for common control channel service data units of different sizes and determining that a grant size for Msg3 meets an exact size criterion of a size of the common control channel service data unit+at least one octet.

10. The method of claim 9, wherein the common control channel service data units of different sizes using the same logical channel identifier are indicated by a random access preamble group identifier.

11. The method of claim 9, wherein the determining that the grant size for Msg3 meets an exact size criterion comprises determining that the common control channel service data unit size plus an R/LCID subheader of the medium access control protocol data unit is equal to Msg3 size.

12. An apparatus comprising:
a processor; and
a memory storing instructions thereon that, when executed by the processor, cause the apparatus to perform at least:
determining a grant for data to be communicated, wherein the determining comprises identifying one or more logical channels to be multiplexed into a medium access control protocol data unit for the data to be communicated,
wherein a length field of at least one logical channel service data unit is configured to be omitted from the medium access control protocol data unit, wherein the length field is omitted based on determining that the logical channel service data unit is a common control channel service data unit of the medium access control protocol data unit, wherein multiple logical channel identifiers are linked to different fixed sizes such that a logical channel identifier is configured to indicate a respective size of the common control channel service data unit.

13. The apparatus of claim 12, wherein a logical channel identifier for at least one logical channel of the multiplexed logical channels is configured to be omitted from the medium access control protocol data unit, and wherein the determining comprises:
determining that the grant is fulfilling at least one pre-established condition, wherein the at least one pre-established condition comprises the grant is for use with only one logical channel, and wherein based on the pre-established condition the grant comprises a logical channel identifier for the one logical channel is omitted from the medium access control protocol data unit.

14. The apparatus of claim 13, wherein the grant further comprises a Length field of a medium access control sub-header is set to all zeros to indicate that no more service data units for the at least one logical channel configured to omit logical channel identity will follow.

15. The apparatus of claim 13, wherein the grant further comprises a one bit data control field that is set to indicate that one of a Length field follows for a service data unit of a logical channel configured with logical channel identity omit, or a logical channel identifier subheader follows for at least one of a control element or a service data unit of a logical channel not configured with omitted logical channel identity.

16. The apparatus of claim 13, wherein the at least one pre-established condition comprises the identified logical channels being more than one logical channel and only one logical channel of the more than one logical channel has no data to send, and wherein based on the pre-established condition the grant comprises a logical channel identifier for the only one logical channel is omitted, and a one-byte length field is set to all zeros.

17. The apparatus of claim 13, wherein the logical channel identifier for more than one logical channel is configured to be omitted from the medium access control protocol data unit, wherein the grant comprises those logical channels in a pre-established order.

18. The apparatus of claim 13, wherein the instructions stored on the memory, when executed by the processor, further cause the apparatus to perform at least:
determining a subset of the more than one logical channel with no data to send; and
based on the determining, configuring a Length to be set to all zeros to indicate a start of a next logical channel without a logical channel identifier for the subset of the more than one logical channel.

19. The apparatus of claim 12, wherein the length field is omitted based on determining that a length field for the common control channel service data unit meets an exact size criterion.

20. The apparatus of claim 12, wherein the length field is omitted based on at least one of determining that a same logical channel identifier is used for common control channel service data units of different sizes and determining that a grant size for Msg3 meets an exact size criterion of a size of the common control channel service data unit+at least one octet.

21. The apparatus of claim 20, wherein the common control channel service data units of different sizes using the same logical channel identifier are indicated by a random access preamble group identifier.

22. The apparatus of claim 20, wherein the determining that the grant size for Msg3 meets an exact size criterion comprises determining that the common control channel service data unit size plus an R/LCID subheader of the medium access control protocol data unit is equal to Msg3 size.

23. A method comprising:
receiving a grant for data to be communicated, comprising one or more logical channels multiplexed into a medium access control protocol data unit for the data to be communicated,
wherein a length field of at least one logical channel service data unit is configured to be omitted from the medium access control protocol data unit, wherein the grant omits the length field based on determining that the logical channel service data unit is a common control channel service data unit of the medium access control protocol data unit, wherein multiple logical channel identifiers are linked to different fixed sizes such that a logical channel identifier is configured to indicate a respective size of the common control channel service data unit.

24. The method of claim 23, wherein a logical channel identifier for at least one logical channel of the multiplexed logical channels is configured to be omitted from the medium access control protocol data unit, the method comprising:
determining that the grant is fulfilling at least one pre-established condition, wherein the at least one pre-established condition comprises the grant is for use with only one logical channel, and wherein based on the pre-established condition the grant comprises a logical channel identifier for the one logical channel is omitted from the medium access control protocol data unit.

25. The method of claim 24, wherein the grant further comprises a Length field of a medium access control subheader set to all zeros to indicate that no more service data units for the at least one logical channel configured to omit logical channel identity will follow.

26. The method of claim 24, wherein the at least one pre-established condition comprises the identified logical channels being more than one logical channel and only one logical channel of the more than one logical channel has no data to send, and wherein based on the pre-established condition the grant comprises a logical channel identifier for the only one logical channel is omitted, and a one-byte length field is set to all zeros.

27. The method of claim 24, wherein the logical channel identifiers for the more than one logical channel are omitted from the medium access control protocol data unit, wherein the grant comprises those logical channels in a pre-established order.

28. The method of claim 23, wherein the length field is omitted based on determining that the length field for the common control channel service data unit meets an exact size criterion.

29. The method of claim 23, wherein the length field is omitted based on at least one of that a same logical channel identifier is used for common control channel service data units of different sizes and that a grant size for Msg3 meets an exact size criterion of a size of the common control channel service data unit+at least one octet.

30. The method of claim 29, wherein the common control channel service data units of different sizes using the same logical channel identifier are indicated by a random access preamble group identifier.

31. The method of claim 29, wherein the determining that the grant size for Msg3 meets an exact size criterion comprises determining that the common control channel service data unit size plus an R/LCID subheader of the medium access control protocol data unit is equal to Msg3 size.

32. An apparatus comprising:
a processor; and
a memory storing instructions thereon that, when executed by the processor, cause the apparatus to perform at least:
receiving a grant for data to be communicated, comprising one or more logical channels multiplexed into a medium access control protocol data unit for the data to be communicated,
wherein, based on the grant fulfilling at least one pre-established condition, a length field of at least one logical channel service data unit is configured to be omitted from the medium access control protocol data unit, wherein the length field is omitted based on determining that the logical channel service data unit is a common control channel service data unit of the medium access control protocol data unit, wherein multiple logical channel identifiers are linked to different fixed sizes such that a logical channel identifier is configured to indicate a respective size of the common control channel service data unit.

33. The apparatus of claim 32, wherein a logical channel identifier for at least one logical channel of the multiplexed logical channels is configured to be omitted from the medium access control protocol data unit, and wherein the determining comprises:
determining that the grant is fulfilling at least one pre-established condition, wherein the at least one pre-established condition comprises the grant is for use with only one logical channel, and wherein based on the pre-established condition the grant comprises a logical channel identifier for the one logical channel is omitted from the medium access control protocol data unit.

34. The apparatus of claim 33, wherein the grant further comprises a Length field of a medium access control subheader set to all zeros to indicate that no more service data units for the at least one logical channel configured to omit logical channel identity will follow.

35. The apparatus of claim 32, wherein the at least one pre-established condition comprises the grant is for use with more than one logical channel and only one logical channel of the more than one logical channel has no data to send, and wherein based on the pre-established condition the grant comprises a logical channel identifier for the only one logical channel is omitted, and a one-byte length field is set to all zeros.

36. The apparatus of claim 32, wherein logical channel identifiers for the more than one logical channels are omitted from the medium access control protocol data unit, wherein the grant comprises those logical channels in a pre-established order.

37. The apparatus of claim 32, wherein the length field is omitted based on determining that the length field for the common control channel service data unit meets an exact size criterion.

38. The apparatus of claim 32, wherein the length field is omitted based on at least one of that a same logical channel identifier is used for common control channel service data units of different sizes and that a grant size for Msg3 meets an exact size criterion of a size of the common control channel service data unit+at least one octet.

39. The apparatus of claim 32, wherein the common control channel service data units of different sizes using the same logical channel identifier are indicated by a random access preamble group identifier.

40. The apparatus of claim 38, wherein the determining that the grant size for Msg3 meets an exact size criterion comprises determining that the common control channel service data unit size plus an R/LCID subheader of the medium access control protocol data unit is equal to Msg3 size.

* * * * *